Nov. 9, 1937.  F. R. RAMSEY  2,098,308
HOIST
Filed Jan. 4, 1936
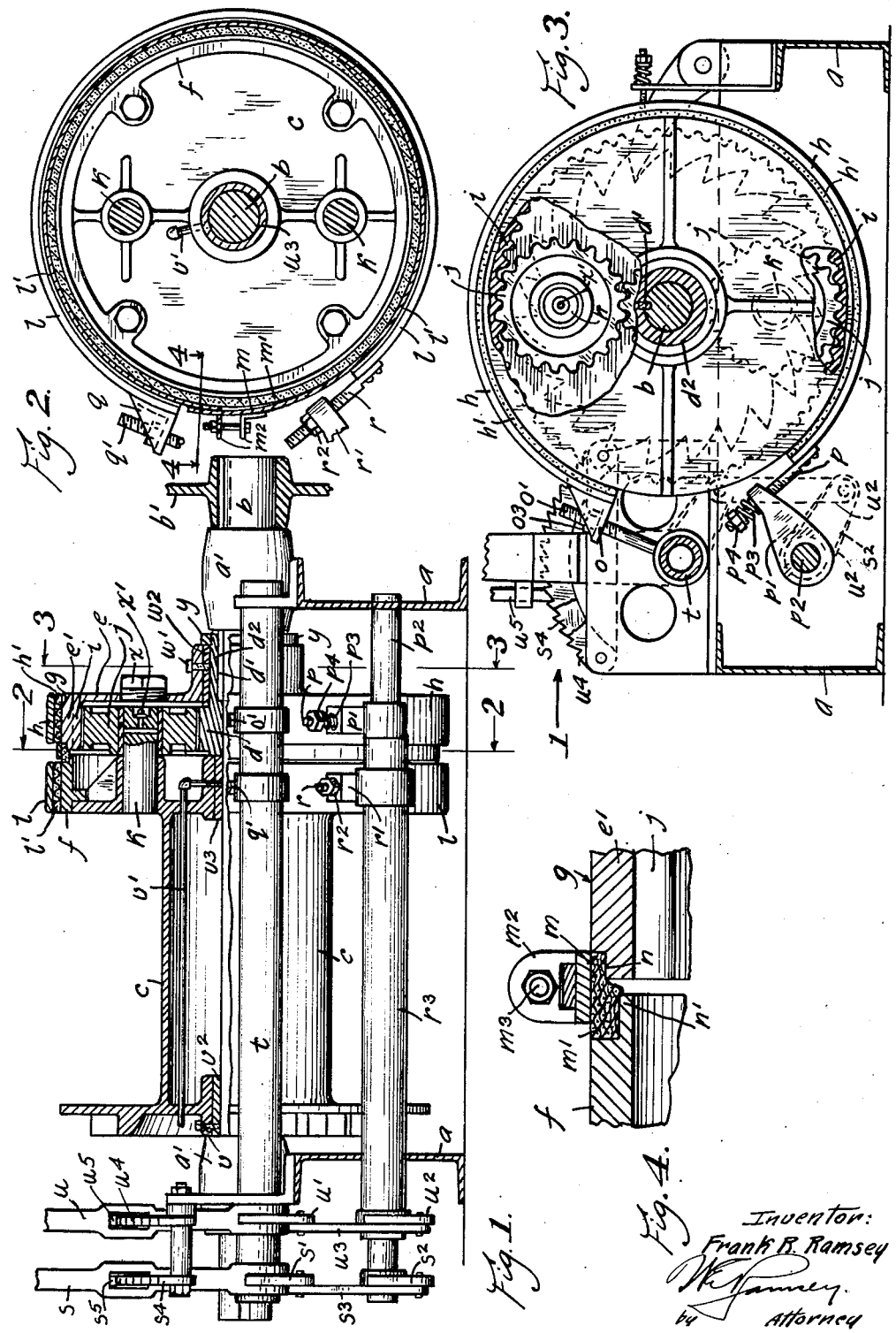
Inventor:
Frank R. Ramsey
by [signature]
Attorney Patented Nov. 9, 1937

2,098,308

UNITED STATES PATENT OFFICE 2,098,308

HOIST

Frank R. Ramsey, Portland, Oreg.

Application January 4, 1936, Serial No. 57,481

10 Claims. (Cl. 254—187)

My invention relates to general utility hoists. It has for its particular object the provision of a sturdy compact hoist, of light weight with regard to its capacity, one which is adapted for distant control, one in which the parts are adapted for adequate lubrication and with a clutch member adapted to run free when not engaged.

A further object of my invention is to provide driving mechanism wholly housed within the drum and clutch members and sealed by a felt member serving to keep the dust out of said moving parts and to seal the lubricant contact with the latter.

A further object of my invention is to provide connections for said hoist adapted for distant control, said connections being arranged concentrically one within the other so as to limit potential injury to said parts and to minimize the space occupied by the latter and the support required therefor.

A further and more specific object of my invention is to provide means for maintaining the felt seal around the operating mechanism in relatively tight engagement with the moving parts and with the parts so arranged that the clutch when disengaged will always rotate freely, a take-up nut being provided for accomplishing this object quickly and easily.

The details of my invention and further specific objects are hereinafter described with reference to the accompanying drawing, in which:

Fig. 1 is an elevation of a hoist embodying my invention with the top half thereof shown in section, said figure is taken substantially in the direction of the arrow *l* in Fig. 3;

Fig. 2 is a transverse section taken on the line 2—2 in Fig. 1 showing the flanged end of the hoisting drum and the brake actuating connections thereon;

Fig. 3 is an end elevation of said hoist with portions shown broken away to disclose operating details otherwise concealed, said view being taken on the line 3—3 in Fig. 1; and Fig. 4 is a fragmentary diagrammatic section taken on the line 4—4 in Fig. 2 and shown on an enlarged scale, of the joint between the drum flange and the flange of the clutch member, said view illustrating how a seal is maintained between two said members.

My invention is shown embodied in a hoist comprising a frame $a$ journaling a driven drum shaft $b$. Two journal or bearing members $a'$ support said shaft at the sides of the frame member, as is shown in Fig. 1. At one end of said shaft a sprocket $b'$ is fixed, a fragment of said sprocket being shown in Fig. 1. It is to be understood that said drum shaft $b$ can be driven by any member thru which power can be supplied to the hoist. The drum $c$ is rotatably mounted upon the shaft and is held against lateral movement in one direction by one of the journal members and in the other by an external pinion $d$ keyed to the shaft $b$ by the key member $d'$. Said external pinion thus serves as a means for locking the drum against end movement upon said shaft as well as to drive the drum thru the gears hereinafter referred to.

Said external pinion has an elongated sleeve $d2$ and it is upon this sleeve that a clutch member $e$ is mounted. Such clutch member $e$ is a disc having a laterally projecting peripheral flange $e'$ alined with the brake flange $f$ on the drum $c$. The external surface of the flange $e'$ defines the clutch surface $g$ which is frictionally engaged by a contracting clutch band $h$ having friction material $h'$ arranged upon its inner face.

The inner surface of the flange $e'$ carries an integral internal gear $i$ shown most clearly in Fig. 3. Planetary gears or pinions $j$ are journaled upon laterally projecting pins $k$ carried by the drum $c$, as is shown in Fig. 1. Said planetary gears engage both the internal gear $i$ and the external pinion $d$ and are arranged to be constantly in mesh. I preferably provide two planetary gears arranged at diametrically opposed points with relation to the axis of rotation of the drum shaft $b$ so that the strains induced by the transmission of power from the external pinion to the internal gear thru said planetary gears will be concentric about the axis of revolution of said shaft $b$.

The drum flange $f$ is provided with a friction band $l$ having friction material $l'$ arranged upon its inner face in the usual manner. The flanges $f$ and $e'$, respectively, are substantially of uniform diameter and are arranged in relatively close abutment with each other. Overlying the joint or space between said flanges I arrange a sealing element comprising an encompassing band $m$ which carries a felt strip $m'$ upon its inner face. As is detailed in Fig. 4, two shouldered seats are arranged upon the flanges $e'$ and $f$, respectively, the seat $n$ in the clutch flange $e'$ being shallower than the seat $n'$ formed in the drum flange $f$. The band $m$ is adapted to be adjusted by two upstanding ears $m2$ having a bolt $m3$ passing therethru. When the bolt $m3$ is cinched up the band engages tightly the seat $n$ in the clutch member $e$ and rotates therewith. The seat being deeper thus is not similarly engaged and the felt washer merely rides upon said seat $n'$ but tends to prevent water, dust, dirt, grit and other foreign injurious substances from passing by said flanges $e'$ and $f$, and into the gears housed therein.

The presence of a felt seal permits a viscous or semi-viscous lubricant to be placed in the space defined by the drum flange and the clutch disc and surrounding the gears. Ordinarily this is impractical because the lubricant will leak out and lodge between the brake and clutch flanges and their friction applying bands.

The clutch band $h$ substantially encircles the flange $e'$, as is shown in Fig. 3. One end of said band terminates in an outstanding flange $o$ which is pivotally anchored to a tube $t$ thru an adjustable anchor bolt $o'$ provided with a threaded nut $o3$. The other end of said band terminates in a threaded stem $p$ which extends thru an apertured arm $p'$, which is fast to an actuating rod $p2$. A coiled compression spring $p3$ encircles said stem $p$ and lies between the actuating rod $p2$ and a nut $p4$. The function of said spring is to provide a yielding member thru which pressure may be exerted on the clutch band and thus the clutch may be only partially applied and be "slipped" upon the clutch flange $e'$, if this is desired.

The brake band $l$ terminates in a flange $q$ adapted to be secured to an anchor bolt $q'$. The other end of said brake band is provided with a stem $r$ which engages a brake actuating arm $r'$ and some measure of adjustment is provided by a nut $r2$ engaged with said stem and bearing upon the arm $r'$. Said arm $r'$ is fixed to a tube $r3$, the bore of which bears on the actuating rod $p2$. One end of the rod $p2$ is journaled in the frame, as is shown in Fig. 1 and the tubular actuating member $r3$ is journaled in the frame at the opposite side, as is shown in said figure.

Separate operating levers spaced from said hoist are adapted to rotate the actuating tubular member and the rod independently to apply the clutch band and the brake band selectively. A clutch lever $s$ is pivotally mounted on a rod $t$. A lateral arm $s'$ secured to a lateral arm $s2$ on the clutch actuating rod $p2$ are secured together by a pivoted link $s3$. For convenience in operation the clutch lever is provided with a circular ratchet $s4$ and a depressible pawl $s5$ for locking the clutch lever in the desired position. The brake lever $u$ operates similarly being provided with a lateral arm $u'$ pivotally mounted on the rod $t$ and a lateral arm $u2$ on the tube $r3$. Said arms $u'$ and $u2$ are secured together by a pivotal link $u3$. Said brake lever is also provided with a ratchet $u4$ and a releasable pawl $u5$ for locking the brake lever in set positions in the same manner as is the clutch lever.

Lubricating fittings $v$—$v'$ are provided for the drum $c$ extending thru the two bushed bearings $v2$—$v3$ for said drum. A similar fitting $w'$ is arranged to extend thru the bushed bearing $w2$ of the clutch member $e$.

A removable plug $x$ is arranged in the face of the clutch member $e$ and when removed access can be had to the lubricating fittings $x'$ in each of the bearings of the planetary gears $j$.

Said hoist is driven by the engagement of the clutch band $h$ gripping the flange $e'$ upon the clutch member $e$. When said clutch is disengaged and the drum shaft $b$ is rotated the external pinion $d$ rotates with the shaft because it is fixed thereto but the drum does not. Said pinion rotates the clutch member $e$ in the opposite direction because the clutch plate is provided with the internal gear $i$ with which the planetary gears $j$ are in engagement as well as with the external pinion $d$. When the clutch plate is held fixed it causes the planetary gears to climb upon the internal gear and to rotate the drum in the same direction as the shaft but at a speed corresponding to the ratio developed by the gear train composed of the external gear, the planetary gears and the internal gear. The drum can be locked against rotation by engagement of the brake band $l$.

The clutch is engaged by its band $h$ moving the lever $s$ counter-clockwise as viewed in Fig. 3 which rotates the rod $p2$ and the arm $p'$ in the same direction to the action of the arms $s'$, $s2$ and the link $s3$.

The brake is applied by a similar movement of the brake lever $u$ to actuate the tubular member $r3$ and the arm $r'$ thru the action of the lateral arms $u'$, $u2$ and the link $u3$ which joins the latter two arms. As has been pointed out, the felt sealing member is cinched tightly in place so as to rotate with the clutch member and to bear against the seat $m'$ in the drum flange to prevent foreign materials from moving from the exterior of said parts into the operating gears housed within the clutch and the drum flange. If said felt becomes hardened or worn the clutch can be moved towards the brake flange by the threaded thrust nut $y$. Said thrust nut is threaded on the hub or sleeve $d2$ of the external pinion $d$, upon which the clutch member $e$ is journaled. Threading said nut $y$ onto said hub causes the clutch member to be moved towards the drum flange and to compress the felt member correspondingly in its seat $n$ and $n'$ respectively.

The sleeve or hub $d2$ of the external pinion extends beyond the corresponding flange or hub of the clutch as is shown in Fig. 1 and thus said hub or sleeve $d2$ spaces the journal $a1$ at the right hand side of Fig. 1 away from the clutch and permits the clutch always to run freely. The hub or sleeve $d2$ of the said external pinion thus serves as a thrust member to take up the end play of the shaft $b$ in its bearings.

I claim:

1. A hoist comprising a frame, a driven shaft journaled thereon, a drum and disc rotatably arranged relatively upon said shaft, an external gear fixed to said shaft, an internal gear carried by said disc and a planetary gear journaled on said drum upon an axis spaced laterally from that of the driven shaft, the said gears intermeshing and thus operatively engaging each other, said disc and drum elements provided with laterally projecting cylindrical braking surfaces arranged in approximate abutment with each other overlying and housing said gear elements and means extending across the abutting edges of said braking surfaces and constituting a seal between said parts.

2. A hoist comprising a frame, a driven shaft journaled thereon, a drum and disc rotatably arranged relatively upon said shaft, an external gear fixed to said shaft, an internal gear carried by said disc and a planetary gear journaled on said drum upon an axis spaced laterally from that of the driven shaft, the said gears intermeshing and thus operatively engaging each other, said disc and drum elements provided with laterally projecting cylindrical braking surfaces arranged in approximate abutment with each other overlying and housing said gear elements and a member extending across the abutting edges of said braking surfaces and constituting a seal between said parts.

3. A hoist comprising a frame, a driven shaft journaled thereon, a drum and disc rotatably arranged relatively upon said shaft, an external gear fixed to said shaft, an internal gear carried by said disc and a planetary gear journaled on said drum upon an axis spaced laterally from that of the driven shaft, the said gears intermeshing and thus operatively engaging each other, said disc and drum elements provided with laterally projecting cylindrical braking surfaces arranged in approximate abutment with each other overlying and housing said gear elements and a compressible member extending across the abutting edges of said braking surfaces and constituting a seal between said parts.

4. A hoist comprising a frame, a driven shaft journaled thereon, a drum and disc rotatably arranged relatively upon said shaft, an external gear fixed to said shaft, an internal gear carried by said disc and a planetary gear journaled on said drum upon an axis spaced laterally from that of the driven shaft, the said gears intermeshing and thus operatively engaging each other, said disc and drum elements provided with laterally projecting cylindrical braking surfaces arranged in approximate abutment with each other overlying and housing said gear elements and a felt member extending across the abutting edges of said braking surfaces and constituting a seal between said parts.

5. A hoist comprising a frame, a driven shaft journaled thereon, a drum and disc rotatably arranged relatively upon said shaft, an external gear fixed to said shaft, an internal gear carried by said disc and a planetary gear journaled on said drum upon an axis spaced laterally from that of the driven shaft, the said gears intermeshing and thus operatively engaging each other, said disc and drum elements provided with laterally projecting cylindrical braking surfaces arranged in approximate abutment with each other overlying and housing said gear elements and a compressible felt member extending across the abutting edges of said braking surfaces and constituting a seal between said parts.

6. A hoist comprising a frame, a driven shaft journaled thereon, a drum and disc rotatably arranged relatively upon said shaft, an external gear fixed to said shaft, an internal gear carried by said disc and a planetary gear journaled on said drum upon an axis spaced laterally from that of the driven shaft, the said gears intermeshing and thus operatively engaging each other, said disc and drum elements provided with laterally projecting cylindrical braking surfaces arranged in approximate abutment with each other overlying and housing said gear elements and a compressible felt member extending across the abutting edges of said braking surfaces and constituting a seal between said parts, one of said braking surfaces being of slightly greater diameter than the other, said felt member being gripped to the braking surface of greater diameter and having sliding engagement with the braking surface of lesser diameter.

7. A hoist comprising a frame, a driven shaft journaled thereon, a drum and disc rotatably arranged relatively upon said shaft, an external gear fixed to said shaft, an internal gear carried by said disc and a planetary gear journaled on said drum upon an axis spaced laterally from that of the driven shaft, the said gears intermeshing and thus operatively engaging each other, said disc and drum elements provided with laterally projecting cylindrical braking surfaces arranged in approximate abutment with each other, said external gear having a hub extending laterally therefrom, said disc being rotatably mounted wholly upon said gear hub and being laterally shiftable thereon.

8. A hoist comprising a frame, a driven shaft journaled thereon, a drum and disc rotatably arranged relatively upon said shaft, an external gear fixed to said shaft, an internal gear carried by said disc and a planetary gear journaled on said drum upon an axis spaced laterally from that of the driven shaft, the said gears intermeshing and thus operatively engaging each other, said disc and drum elements provided with laterally projecting cylindrical braking surfaces arranged in approximate abutment with each other, said external gear having a hub extending laterally therefrom, said disc being rotatably mounted wholly upon said gear hub, being laterally shiftable thereon and lying inwardly from the end of the latter.

9. A hoist comprising a frame, a driven shaft journaled thereon, a drum and disc rotatably arranged relatively upon said shaft, an external gear fixed to said shaft, an internal gear carried by said disc and a planetary gear journaled on said drum upon an axis spaced laterally from that of the driven shaft, the said gears intermeshing and thus operatively engaging each other, said disc and drum elements provided with laterally projecting cylindrical braking surfaces arranged in approximate abutment with each other, said external gear having a hub extending laterally therefrom, said disc being rotatably mounted upon said gear hub and lying inwardly from the end of the latter, a thrust member carried by said gear hub adapted to shift the disc endwise of the shaft thus to vary the space between the braking surfaces.

10. A hoist comprising a frame, a driven shaft journaled thereon, a drum and disc rotatably arranged relatively upon said shaft, an external gear fixed to said shaft, an internal gear carried by said disc and a planetary gear journaled on said drum upon an axis spaced laterally from that of the driven shaft, the said gears intermeshing and thus operatively engaging each other, said disc and drum element provided with laterally projecting cylindrical braking surfaces arranged in approximate abutment with each other, said external gear having a hub extending laterally therefrom, said disc being rotatably mounted upon said gear hub and lying inwardly from the end of the latter, a thrust nut screw-threaded to said gear hub adapted to shift the disc endwise of the shaft thus to vary the space between the braking surfaces.

FRANK R. RAMSEY.